July 10, 1956  C. A. MABEY  2,753,713
REMOTE READING RESISTANCE THERMOMETER
Filed Aug. 11, 1953  3 Sheets-Sheet 1
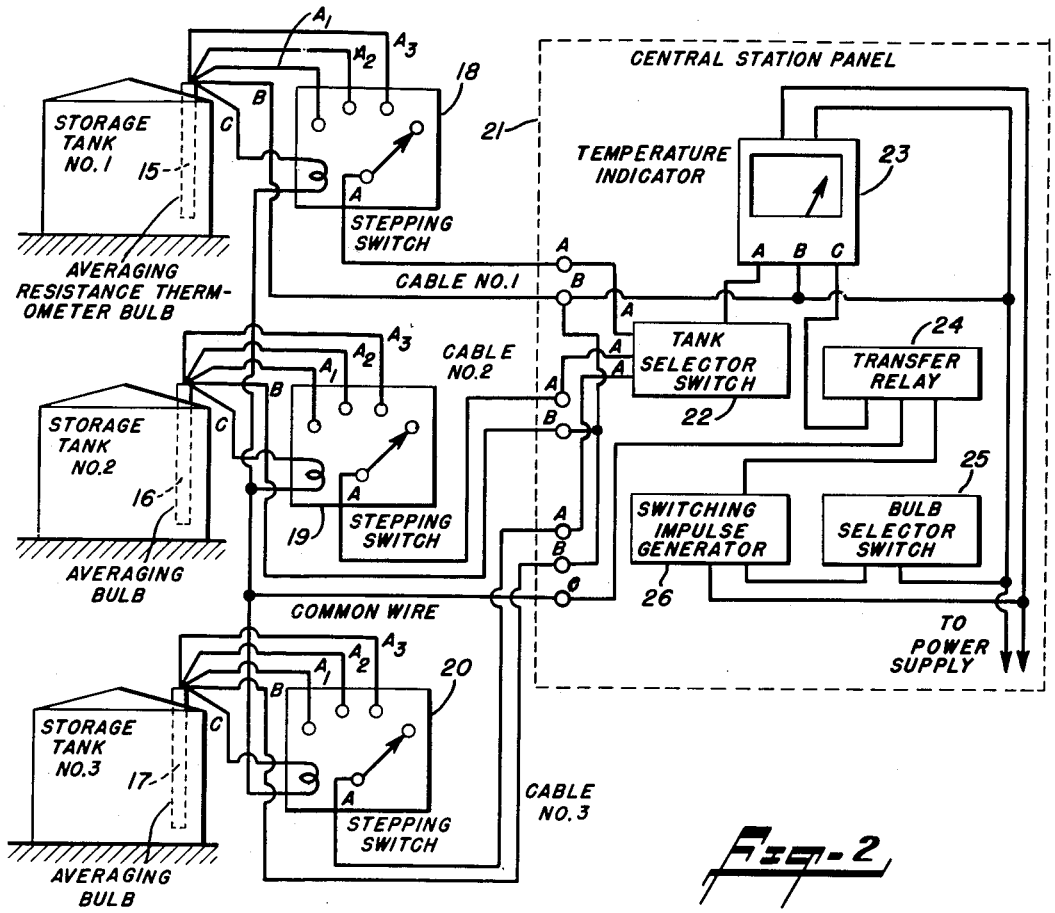
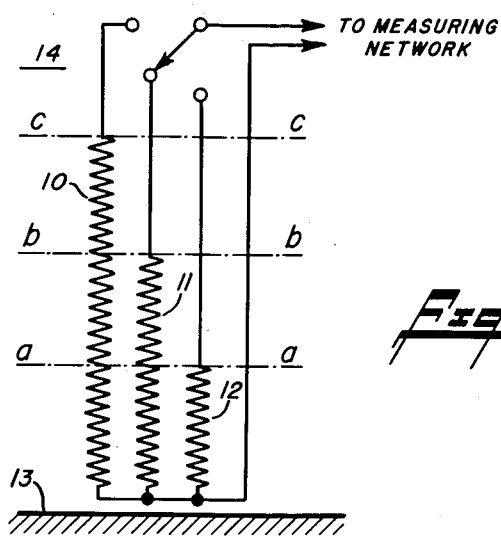
CHARLES A. MABEY
INVENTOR.
BY
ATTORNEYS July 10, 1956
C. A. MABEY
2,753,713
REMOTE READING RESISTANCE THERMOMETER
Filed Aug. 11, 1953
3 Sheets-Sheet 2
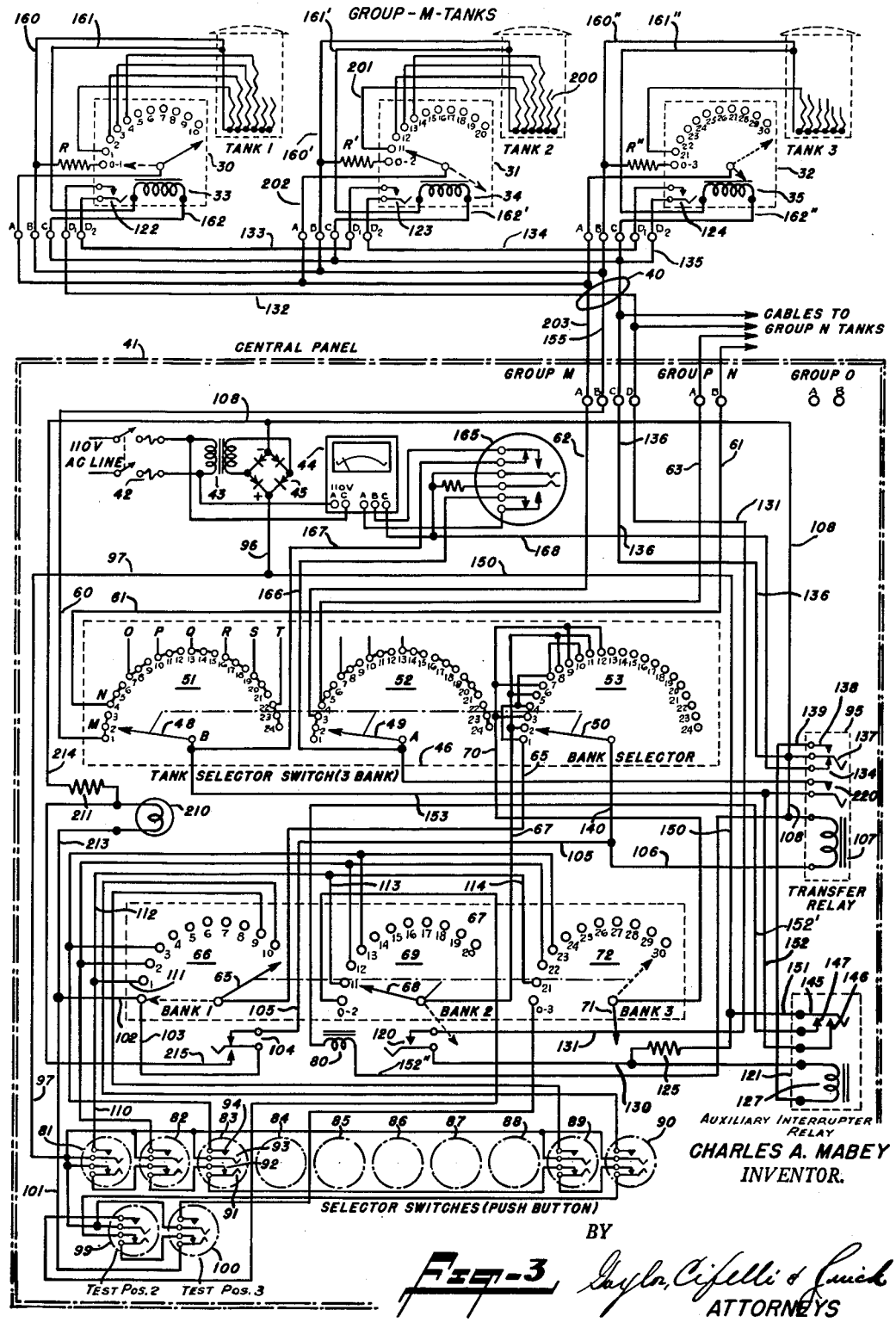
CHARLES A. MABEY
INVENTOR.
BY
Taylor, Cifelli & Quick
ATTORNEYS July 10, 1956 C. A. MABEY 2,753,713
REMOTE READING RESISTANCE THERMOMETER
Filed Aug. 11, 1953 3 Sheets-Sheet 3

CHARLES. A. MABEY
INVENTOR.

BY
Gayla, Cifelli & Quick
ATTORNEYS

United States Patent Office 2,753,713
Patented July 10, 1956

2,753,713

REMOTE READING RESISTANCE THERMOMETER

Charles A. Mabey, Upper Montclair, N. J., assignor to Weston Electrical Instrument Corporation, Newark, N. J., a corporation of New Jersey Application August 11, 1953, Serial No. 373,651

9 Claims. (Cl. 73—342)

This invention relates to apparatus for the measurement of the average temperature of a fluid contained in a storage tank and the transmittal of such information to a remote station.

While the invention is adapted for use in numerous applications wherein selected readings of a variable condition are to be taken at a remote point, the following description will be restricted to the specific problem of determining the average temperature of oil contained in a plurality of storage tanks and the transmittal of such temperature measurements to a central, remote station.

In the case of oil storage tanks it is necessary to know the average temperature of the oil at different levels thereof. The volume of the oil varies with temperature and available metering apparatus does not include automatic means compensating for the actual temperature of the oil as it is metered. Such metering apparatus is calibrated at a standard, or base, temperature usually 60° F. Consequently, unless allowance is made for the actual temperature of the oil at the time of metering, a loss accrues to the seller if the temperature of the oil is below 60° F. and, on the other hand, such loss befalls the purchaser if the actual temperature of the oil is above this temperature. Inasmuch as the temperature of oil within a storage tank varies at different levels an accurate determination of the average temperature requires an averaging of the various temperatures throughout the entire depth of the oil. Further, the actual depth of the oil varies from time to time, specifically, as oil is withdrawn from or added to the tank. In bulk storage the variation in the absolute volume of the contained oil is determined by measurements of depth and temperature. Here too it is apparent that the average temperature of the oil substantially throughout its entire depth is required.

The temperature sensing device used in the practice of this invention is described in United States patent application Serial No. 169,704, filed June 22, 1950, now Patent No. 2,694,930, in the names of Anthony H. Lamb and Earl F. Adams and entitled Temperature Measuring Apparatus. Briefly, such sensing device comprises a plurality of resistance wires enclosed within a suitable flexible housing said wires having different lengths but equal ohmic resistance values. Such wires each have one end connected together to form a common junction which is disposed at the bottom of the storage tank whereby the other ends of the wires terminate at different vertical levels. Once the level of the oil in the storage tank has been determined the operator selects the longest resistance wire which is completely immersed in the oil. Each resistance wire is so made that the resistance is uniformly distributed throughout its length whereby the total ohmic value of the immersed wire will depend upon the average temperature of the oil throughout that particular level. The wires are selectively connectable to an electrical network that includes a scale calibrated in temperature values.

In applying such multiple-element resistance thermometers to a large tank farm installation, it is frequently desired to have the indication of the average temperature at a central station which, in general, may be quite remote from the point of measurement. For example, tank farms for the storage of petroleum products commonly consist of many large tanks located at distances of thousands of feet from a central station or pump house. Simple extension of the leads from each of the resistance elements results in a multiplicity of conductor leads; actually one lead being required for each resistance element and two additional leads, all multiplied by the number of tanks served. Also, the size of these conductor leads must be such as not to introduce excessive ohmic resistance into the measuring circuit. In a typical installation, for example, a ten element thermometer would require a twelve conductor cable of #12 B & S wire for each tank at a distance of 2,000 feet from the panel located in the central station.

In order to minimize the cost of the cable for a multi-tank installation it is obviously desirable to reduce to a minimum the number of conductors required and an object of this invention is the provision of a system directed toward this end.

A more specific object of this invention is the provision of a remote reading averaging resistance thermometer system of the synchronous operation type whereby selected temperature readings are transmitted to a reading station remotely located from the point of temperature measurement.

An object of this invention is the provision of a remote reading, averaging resistance thermometer system comprising a plurality of resistance units located at the points where temperature readings are to be made, a remote point to which such readings are to be transmitted, means controlled at the remote point for selecting one of the resistance units, and means effective upon such selection for transmitting the temperature reading of the selected resistance unit to the remote point.

An object of this invention is the provision of a remote reading, averaging resistance thermometer system comprising a plurality of resistance units located at the points where temperature readings are to be made, an electrically-operated stepping switch having stationary contacts individually connected to the resistance units, a measuring circuit including a temperature indicating instrument located at a remote point, control means at the remote point and including a pair of conductor cables for operating the stepping switch to select a selected resistance unit and means including a second pair of cables for connecting the selected resistance unit into the measuring network.

An object of this invention is the provision of a remote reading system for measuring the average temperature of liquids stored in a plurality of containers, said system comprising a plurality of multi-element resistance units, one such unit being disposed in each container; pulse-actuated means at said containers and adapted to connect a single selected element to transmission lines; a measuring network including a temperature indicating instrument, said network being disposed at a point remote from the containers and adapted for connection to transmission lines; electrical impulse-producing means at the remote point; selectively operable means controlling the actuation of the impulse producing means to thereby send a predetermined number of electrical impulses over the transmission lines to the said pulse-actuated means; and means effective upon completion of the predetermined number of pulses to connect the selected resistance element to the measuring network.

These and other objects and advantages will become apparent from the following description when taken with the accompanying drawings. It will be understood the drawings are for purposes of illustration and are not to be construed as defining the scope or limits of the invention, reference being had for the latter purpose to the appended claims.

In the drawings wherein like reference characters denote like parts in the several views:

Figure 1 is a diagrammatic representation of a three element averaging resistance thermometer, or bulb;

Figure 2 is an elementary circuit arrangement illustrating, in a schematic sense, the principle of operation of my remote reading, averaging resistance thermometer system;

Figure 3 is a wiring diagram of the system;

Figure 4:
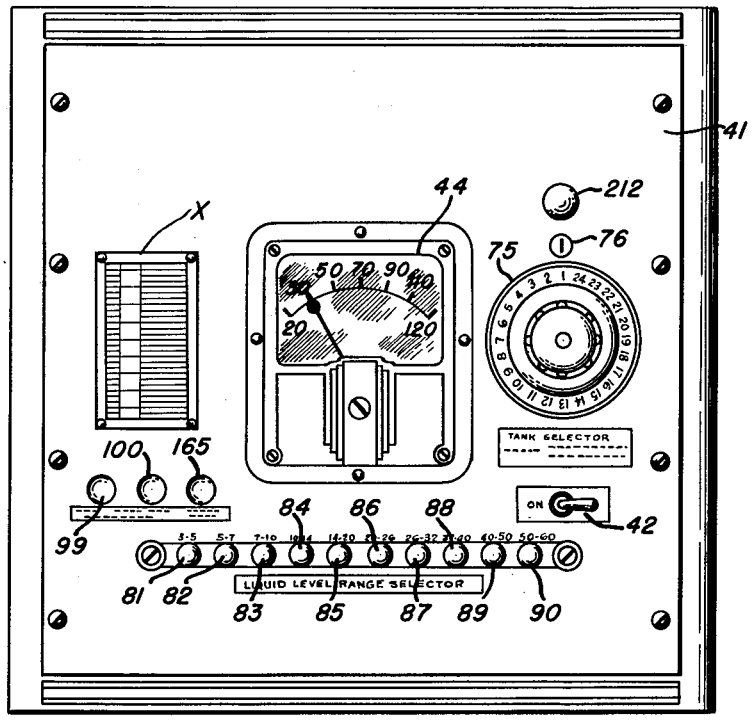
Figure 4 is a front view of the control panels located at the central station.

Reference is now made to Figure 1. Here I show an averaging resistance thermometer, or bulb, comprising three resistance wires 10, 11 and 12 connected together at the lower end. These wires have different axial lengths but the same ohmic resistance and normally are enclosed within a flexible, protective housing. If, now, the bulb is disposed vertically in a storage tank with the common junction of the wires close to the bottom 13 of the tank it will be apparent that each wire terminates at a different level. The long wire 10 has a length such that when the tank is filled to the maximum level, as indicated by the line c—c, the wire will be completely immersed in the oil. When the level of the oil is at the point indicated by the line b—b the wire 11 is completely immersed whereas the wire 12 is completely immersed when the level of the contained oil drops to the line a—a. It will be apparent that once the actual level of the oil has been determined the longest, completely immersed wire can be connected to an appropriate measuring network by means of the selector switch 14. Such network includes an electrical indicating instrument having a scale calibrated in temperature values and the instrument indication will vary with the temperature variation of the particular, selected resistance wire. Since the length of the selected resistance wire corresponds closely to the actual level of the liquid in the tank its total ohmic resistance value will depend upon the average temperature of the oil throughout its entire depth.

While Figure 1 illustrates a resistance bulb having only three resistance wires, a 50 or 60 foot high storage tank normally will require a bulb having 10 wires in order to provide a practical range of average temperature measurements for the different levels of the oil stored therein from time to time. In any case, the individual resistance wires can be connected into the measuring network at will without altering the constants of the network or the accuracy of indications on the instrument as all such wires have the same resistance value at any given temperature.

Reference is now made to Figure 2 which is an elementary circuit arrangement intended to illustrate schematically the principle of operation of my system. Here I show three storage tanks numbered 1, 2, 3, each tank provided with a multi-element, averaging, resistance bulb of the type described hereinabove, each of the bulbs 15, 16 and 17 being shown as a three element bulb for simplicity. From each such bulb there is one lead for each resistance element, a common lead and a compensating, or power, lead, all in accordance with conventional resistance bulb practice. Each of the leads marked $A_1$, $A_2$, $A_3$ are connected to the fixed contacts of the associated, solenoid-operated stepping switches 18, 19 and 20, each resistance element being associated with a fixed contact and, hence, a definite position of the switch arm. The movable contact arm of each stepping switch is connected to the associated leads A of the transmission cables. The common lead B has the double function of serving as the return lead for the resistance bulb elements and it also carries the power for energizing the solenoid of the associated stepping switch when required.

The operating coil of each stepping switch is connected between the leads B and C, as shown, and the C lead may be made common to all of the tanks in any convenient manner through continuous piping, solid wire, or actual ground. The C lead also serves a dual function supplying, alternatively, the measuring voltage for the resistance bulb elements or the impulses for actuating the stepping switches.

The panel 21 is located at a point remote from the storage tanks, preferable in the central control station or pump house. At the panel, the A leads from the several tanks are brought together through a manually-operated tank-selector switch 22 through which the selected one of the distant resistance bulbs is connected to the indicating instrument 23. The B leads are in parallel with those from all other tanks and are carried directly to the indicating instrument. It may here be pointed out that in general it is not advisable to make the B lead common since it is an essential requirement for accurate meter readings that the resistance of the line A be equal to the resistance of line B to within 0.1 ohm or betted. The C lead, or common lead, passes through the contacts of a transfer relay 24 which separates its dual function so that it normally carries only the resistance element circuit voltage but, when required, this line is available for transmitting impulses to the distant stepping switches.

After the desired tank has been selected by means of the tank selector switch 22, the proper resistance element, corresponding to the level of the oil in such tank, is selected by sending out impulses necessary to step the stepping switch at the tank to the position where it connects the correct resistance element to the transmission lines. These impulses may be sent out by operating a push-button, telephone dial switch, or the like. In the specific system to be described with respect to Figure 3 the necessary number of pulses are sent out over the line by auxiliary stepping switches controlled by a series of push buttons in such manner that depression of say, push-button number 5, will automatically cause the auxiliary stepping switch to send out 5 impulses over the transmission line.

Functionally, then, the operator first selects the particular tank whose average temperature he wishes to observe. This is done by manually setting the tank selector switch 22 to the proper position. Having, from other sources, information on the level of the oil in that particular tank, the operator selects the proper resistance bulb element associated with that level. This is done by means of the manually-operable bulb selector switch 25. Operation of the bulb selector switch 25 causes the switching impulse generator 26 to send a predetermined number of electrical impulses over the transmission lines linking the central station panel with the distant stepping switches 18, 19 and 20 located at the tanks. In the illustrated, simplified arrangement, all stepping switches 18, 19 and 20 are connected in parallel whereby the impulses provided by the switching impulse generator 26 will cause all such stepping switches to operate in unison. However, only one of these switches will be connected to the indicator 23 as determined by the aforementioned setting of the tank selector switch 22. The circuit is so arranged that when the stepping switch associated with the selected tank has been brought into positional arrangement to complete the circuit to the desired bulb element, the transfer relay 24 connects such bulb element to the proper wires of the transmission line whereby the resistance of such bulb element will effect the reading of the indicator 23.

My system, which will be described in detail with specific reference to Figure 3, is designed to accommodate 24 tank units arranged in eight (8) groups of three (3) units each, that is, up to and including three switch units may be wired in parallel and operated together. In making a three tank unit installation, therefore, three stepping switches are provided, all identical except that the initial setting of the stepping switches in any tank group is such that the movable arms are 120 angular degrees apart. These stepping switches are designed so that the movable arms sweep over a bank of fixed contacts in 120 degrees of angular travel. Actually, in the system to be described there are eleven (11) fixed contacts on each switch, ten of the contacts being individually connected to the ten elements of the associated multi-element resistance bulb and the eleventh contact being used for test, or checking purposes. The system works on the principle of synchronized operation between a stepping switch at the control panel and one to three stepping switches in a group at the remote tank or tanks. In order that this synchronism be maintained, all switches are initially set at a reference, or "home," position to which they will always return automatically after a reading cycle has been completed.

Reference is now made to the circuit diagram shown in Figure 3. The illustrated arrangement is designed to accommodate 24 tanks arranged in groups of 3 but in order to facilitate the description and a proper understanding of the system, the wiring diagram is complete only with respect to one group of tanks. Thus, the upper portion of the diagram shows three tanks identified as Tank 1, Tank 2, Tank 3, which three tanks form the Group M tank unit. Each of these tanks contains a 10 element resistance bulb but here too, for purposes of simplicity, I show only 4 such elements actually connected in the diagram. It will be apparent, however, that the stepping switches 30, 31, 32, associated respectively with the tanks 1, 2 and 3, are each provided with 11 stationary contacts, 10 of such contacts being individually connected to the ends of the 10 associated resistance elements and the 11th contact, in each case being connected to resistors R, R' and R". These resistors are for the purpose of checking the circuits from time to time as will be explained in more detail hereinbelow. It may here be pointed out however, that in the checking, or testing, of the circuit the resistors R, R' and R" are inserted into the measuring circuit in place of the bulb resistance elements and the resistance values of these resistors are so chosen as to provide a predetermined reading of the indicator located on the main control panel. Indicator deviations from such predetermined reading serve as a warning that the system is out of synchronism.

The stepping switches 30, 31, 32 all operate simultaneously in reponse to electrical impulses applied to the individual operating coils 33, 34, 35. These switches are of the type known as 360 degree switches in that the associated wiper arm will rotate, in step-by-step manner throughout 360 angular degrees. However, in my system, I use only 11 contacts on each switch and I adjust the individual wiper arms 120 degrees apart. Thus, each wiper arm makes contact with its associated, active, stationary contacts for only one-third of each revolution of the arm. Therefore, when the wiper arm of stepping switch 30 engages any of the active contacts numbered O–1 to 10, the wiper arms of the switches 31 and 32 do not engage an active stationary contact. Likewise, when the wiper arm of the switch 31 engages any of its active contacts numbered O–2 to 20 the wiper arms of the switches 30, 32 do not engage an active contact. Similarly, engagement of the wiper arm of the switch 32 with any of its active contacts number O–3 to 30 can only take place when the wiper arms of the switches 30, 31 are out of range of their respective fixed contacts. Therefore, if we assume that the three stepping switches start from a fixed reference, or "home" position, as for example, when the wiper arm of the switch 30 engages its O–1 contact, electrical impulses applied to all three operating coils 33, 34, 35, will cause the three wiper arms to rotate simultaneously in a clockwise direction in step-by-step manner. The first 10 such impulses will cause the wiper arm of the switch 30 to progressively engage its active stationary contacts 1–10. The eleventh impulse will move the wiper arm of the switch 30 out of the effective operating range and will bring the wiper arm of the switch 31 into engagement with its stationary contact number O–2. Succeeding impulses cause the wiper arm of the switch 31 to progressively engage its active contacts until such arm moves to the position corresponding to 21 impulses. After this point the wiper arm of the switch 31 passes beyond its effective operating range and the wiper arm of switch 32 engages its effective, stationary contact numbered O–3. It will be apparent, therefore, that in such arrangement only one resistance element, of the 30 elements involved, can be connected to a wiper arm at any given instant. It is here pointed out that the solid lines represent the relative positions of the three wiper arms when the arm of the center stepping switch 31 engages its associated contact 11. The dotted lines represent the relative positions of the wiper arms when the stepping switches are at the reference, or "home," position, for purposes which will be described hereinbelow.

As stated above, all three of the operating coils of the stepping switches 30, 31, 32 are connected in parallel and energized simultaneously by electrical impulses. Such impulses are obtained from a suitable impulse generator located at the central station control panel and are transmitted to the distant stepping switch operating coils by means of 2 wires of a four-wire transmission line generally indicated by the numeral 40. The central indicator panel 41, located at the central station, or pump house, is shown enclosed within the double, broken lines and is provided with a series of connection terminals marked A, B, C, D arranged in a group and marked Group M. This means that such terminal group is connected, by the transmission lines to the Group M unit of three tanks shown at the top of the diagram. Additional groups of tanks arranged in units of three are also connected to the panel by separate pairs of wires. However, two of the transmission line wires are more or less common and, therefore, these particular wires need not be brought back to the panel from each of the tank groups, although this can be done if desired. In the drawing, I show the preferred arrangement and from this point on I shall refer to the individual transmission wires in terms of the terminals to which the particular wire is connected. Thus, the "A" wire is connected to the "A" terminal of the central panel and to the "A" terminals associated with each of the distant stepping switches 30, 31, 32. Obviously, for the first tank group, Group M, all four wires extend from the tanks 1, 2 and 3 to the terminals A, B, C and D on the panel. With respect to the additional tank groups, such as Group N and Group O, only wires A and B run from each group to the panel, the common wires C and D being connected together at the most convenient points. Preferably such common wires C and D run along all the tanks and one end of each is brought to the control panel.

The central panel carries a line switch 42 the closure of which connects the system to a source of power, such as a conventional A.-C. 60 cycle, power line. Closure of the switch 42 energizes the primary winding of a step-down transformer 43. The secondary winding of the transformer is connected to opposite junctions of a full wave rectifier bridge 45 which bridge provides a D.-C. output of approximately 24 volts for operation of the system.

The rotary tank selector switch 46 is shown enclosed within the dotted lines and comprises three decks, or banks, 51, 52, 53, each deck having 24 stationary contacts and each of the individual movable arms 48, 49, 50 being connected rigidly to a common shaft provided with a suitable knob, not shown in the drawing. This tank selector switch is set manually by the operator and makes it possible for the operator to connect any desired tank to the panel network. It will be noted that the stationary contacts of the left switch deck 51 are connected together in groups of threes. Specifically, contacts numbered 1, 2 and 3 are connected together and to the lead 60 which lead is connected to panel terminal B of Group M. So too, contacts numbered 4, 5 and 6 are connected together and to panel terminal B of Group N, by the lead 62, and contacts numbered 7, 8 and 9 are each connected to panel terminal B of Group O. It is apparent, therefore, that switch arm 48 will select any one of the eight available tank groups M, N, O . . . S, T.

The middle deck 52 of the tank selector switch is arranged similarly to that of deck 51 with the exception that each group of three, adjacent, stationary contacts is connected to the appropriate "A" panel terminal, as shown by the leads 62 and 63.

The reason for switching both the A and B circuits by the switch decks 51 and 52 is twofold, namely, (1) to equalize the resistance in the A and B circuits and (2) to remove power from the unused tanks in the case of the B circuit.

The right hand deck 53, of the tank selector switch, is identified as the bank selector and its function is to select any of the specific tanks 1, 2 or 3 in a given tank group. This deck has a jumper connecting together every third stationary contact. Specifically, the stationary contacts numbered 1, 4, 7, 10, etc., are connected together and to the lead 65 going to the wiper arm 65 of a stepping switch 66. So too, the stationary contacts numbered 2, 5, 8, 11, etc., of deck 53 are connected by the lead 67 to the wiper arm 68 of the stepping switch 69. Similarly, the bank selector contacts 3, 6, 9, 12, etc., are connected by a lead 70 to the wiper arm 71 of a stepping switch 72. Now, assuming there are 24 storage tanks in the farm and such tanks are divided into groups of 3 it will be clear that tanks numbered 1, 2 and 3 can be assigned to Group M, tanks numbered 4, 5 and 6 can be assigned to Group N, tanks numbered 7, 8 and 9 can be assigned to Group O, etc., as is the case in the diagram. By providing a suitable dial attached to the common shaft of the tank selector switch 46, and marking on said dial numbers 1–24 that correspond positionally to the alined stationary contacts of the switch decks 51, 52, 53, the operator need not be concerned with the specific arrangement of the tank groups. Reference is made for the moment to Figure 4 which shows the front of the central control panel 41. Here, the dial switch, just mentioned, is identified by the numeral 75, said dial carrying the peripheral markings 1–24 alignable with the fixed index mark 76. The operator merely rotates the dial to aline the selected tank number with the fixed index mark 76 and the circuit is thereby automatically conditioned to obtain a temperature reading of one of the resistance elements disposed in such selected tank. The panel may also carry a data card X on which are recorded the specific tank locations, or other identifying information, and the numbers assigned thereto.

Once again referring to Figure 3 and assuming that the operator has set the tank selector switch to tank number 2, as shown in the drawing, it is apparent that the wiper arms 48 and 49 are connected only to those stationary contacts which are connected to tank Group M. Also the wiper arm 50, of the deck 53, is connected only to the stepping switch 69 identified as Bank 2. In summary, then, the tank selector switch decks 51 and 52 are employed to connect the circuit to a selected tank group and the deck 53 is employed to connect one of the three tanks of the selected group to the proper one of the stepping switches 66, 69, 72. For purposes of identification, the three tanks forming a tank group are termed Bank 1, Bank 2 and Bank 3 and the stepping switches 66, 69, and 72 are so marked on the drawing. I here point out that the stepping switches 66, 69 and 72 are, actually, three separate banks forming a single stepping switch, all three banks being operated by the single operating coil 80. Such multi-gang, or multi-bank, switches are well known in the art but it is believed the description and understanding of the invention will be facilitated by referring to the three decks as individual stepping switches. The specific circuitry effective upon a setting of the tank selector switch 46 will be described in more detail hereinbelow.

The three stepping switches 66, 69 and 72 are each of the 360 degree type (as already described with reference to the stepping switches 30, 31, 32 located at the tanks of Group M, top of the drawing) and the individual wiper arms 65, 68 and 71 are spaced apart 120 angular degrees. Each of these switches has 11 active stationary contacts disposed over an arc of 120 degrees and the associated wiper arm engages such contacts only for one-third of its complete revolution. The wiper arms are all tied to a common shaft so that all step clockwise in unison in response to energy applied to the operating coil 80. Consequently, only one stationary contact, of the total number of 33 contacts on the three banks can be connected to a wiper arm at any one time. As shown in the drawing, the wiper arm 68 of the bank 2 switch is in contact with the associated stationary contact number 2, and the other wiper arms are out of range of their active, associated contacts. It is here pointed out that the solid lines represent the relative positions of the three wiper arms when the arm 68 is engaging its associated contact number 2, whereas the dotted lines indicate the relative positions of the arms when the stepping switches are in the normal reference, or "home" positions. In the latter case wiper arm 65 engages its stationary contact number 0–1 to condition the electrical network for test purposes, as will be described hereinbelow.

The operation of the level selector stepping switch banks 66, 69, 72 is controlled by any one of a series of push-button switches. Figure 4 shows these push-button switches 81, 82 . . . 90. It will be noted that push-button switch 81 is marked "3–5," switch 82 is marked "5–7," etc.; the last switch 90 being marked "50–60." These markings refer to the range of levels of the oil in the storage tanks and to the proper thermometer element associated with such level range. Specifically, if the level of the oil in a tank selected for measurement is between 3 and 5 feet, depression of switch 81 will automatically condition the system whereby the proper resistance element for this level will be connected into the measuring network to effect the indication of the indicating meter 44. On the other hand, if such oil level is between 32 and 40 feet the operator would depress switch 88 to obtain a proper average temperature reading throughout this depth of oil.

Referring back to Figure 3, the just-described push-button switches are shown at the lower part of the diagram and are identified as selector switches. Again, for purposes of simplicity, only the switches 81, 82, 83, 89 and 90 are shown wired into the circuit. Each of the push-button switches operates as follows: when the button is depressed the two movable contacts 91, 93 are moved outwardly of each other whereby the normally-closed contacts 91, 92 are opened and the normally-open contacts 93, 94 are closed. It appears desirable to here point out that the lower contact sets of each switch are all connected in series and when such contact sets are all closed the transfer relay 95 is energized, by the D. C. voltage output of the rectifier 45. This circuit may be traced as follows (assuming that the wiper arms 65, 68, 71, of the respective bank stepping switches 66, 69, 72 are in the normal reference, or home, positions as indicated by the broken lines): the plus (+) terminal of rectifier 45, leads 96, 97, the lower closed contacts 91, 92 of each of the push-button switches 81–90, inclusive, the similar lower closed contacts of the test switches 99, 100, leads 101, 102, 103, the closed contact blades of switch 104, leads 105, 106, energizing coil 107 (of the transfer relay 95), and lead 108 to the negative (—) terminal of the rectifier. I must here point out that the switch 104, of the stepping switch 66, is controlled by a cam secured to the common shaft carrying the wiper arms 65, 68, 72 and which cam is of a uniform diameter except for a sharp lobe oriented so that the movable arm of switch 104 engages the upper stationary blade only when the wiper arm 65 is in the normal reference position, as is shown in the drawing. Consequently, when the said wiper arms are in any other position the described circuit for energizing the operating coil 107, of the transfer relay, is open. So too, this circuit will be open when any of the push-button switches 81–90, 99, or 100 are depressed.

The function of the transfer relay 95 is to condition the system for the transmission of electrical impulses to the distant stepping switches 30, 31, 32 and thereafter to condition the system for the temperature measuring function. More specifically, when the transfer relay is energized the circuit is in condition for the transmission of impulses and when said relay is deenergized the circuit is in condition for measurement purposes. Since the system is so arranged that all of the stepping switches return to the normal reference, or home, position upon the completion of a selected measurement, the transfer relay normally remains energized when the system is dormant, that is, when no specific temperature measurements are being made. It will be noted that the wiper arm of the stepping switch 30 is connected to the fixed resistor R during such periods of system dormancy. Under this condition such resistor R is connected to the circuit of the instrument 44 and such instrument will provide a predetermined temperature reading. As long as the instrument indication does not differ materially from the predetermined value the operator is assured of the system being in proper operating order or condition.

The specific number of electrical pulses to be sent out over the transmission lines is determined by the position of the tank selector switch 46 and which one of the ten push-button switches 81–90 is depressed by the operator. The electrical circuit for performing this function is controlled by the upper sets of contacts 93, 94 of the push-button switches. Attention is directed to the fact that the stationary contact 94, of the push-button switch 81 is connected to the first active contact on each of the stepping switches 66, 69, 72, as by the leads 110, 111, 112, 113, 114. Similarly, the corresponding stationary contact of the push-button switch 82 is connected to the second active contact on each of the said stepping switches, the corresponding stationary contact of the push-button switch 83 is connected to the third active contact on each of said stepping switches, etc. It is this particular arrangement which causes the stepping switches 66, 69, 72 to operate a definite, number of times depending which of the push-button switches is depressed, as will become more apparent when I describe an actual operating cycle of the system hereinbelow. For the present, suffice to say that the number of electrical impulses transmitted over the transmission lines to the distant stepping switches 30, 31, 32 corresponds exactly to the number of step-by-step operations of the bank stepping switches 66, 69, 72. Therefore, all stepping switches remain in synchronism throughout all operations of the system as a whole.

Step-by-step actuation of the bank stepping switches 66, 69, 72 is brought about, in the conventional manner by alternate energization and de-energization of the associated operating coil 80. Those familiar with the operation of electro-magnetic stepping switches will know that when the operating coil 80 is energized it actuates a ratchet arrangement so that the wiper arm, or arms, advance to the next stationary contact whereupon an interrupter switch 120 opens the circuit to the operating coil. The ratchet arrangement, which is spring biased, then returns to its normal position in which it again permits the interrupter contacts to close thereby repeating the cycle. In my system, however, the interrupter switch 120 is open when the operating coil 80 is de-energized since I employ an auxiliary interrupter relay 121 to control the energization and de-energization of the operating coil. This relay 121 also sends the electrical impulses over the transmission cables to the operating coils of the distant stepping switches 30, 31, 32, thereby assuring simultaneous operation of all such stepping switches. For the present it is deemed sufficient to state that the interrupter relay 121 is controlled by the transfer relay 95. When the transfer relay is energized, as is the case when the system is dormant, the contacts of the interrupter relay 121 are open and the operating coils of the stepping switches are de-energized. When the transfer relay coil 107 is energized its contacts cause the operating coil of the interrupter relay to be energized and the contacts of the latter bring about the energization of the operating coils of the stepping switches causing all wiper arms to advance one step.

As explained above, the interrupter contacts 120, associated with the bank stepping switches 66, 69, 72, close when the wiper arms 65, 68, 71 advance into engagement with the next stationary contacts. The same action takes place with respect to the interrupter contacts 122, 123, 124 associated with the distant stepping switches 30, 31, 32, respectively. When the wiper arms of all stepping switches have advanced to their next respective positions, all of the interrupter switches 120, 122, 123, 124 will be closed and when this happens the operating coil 127, of the auxiliary stepping relay 121 is short-circuited whereby the relay is de-energized. This short-circuiting circuit may be traced as follows from the upper terminal of the operating coil 127; the lead 130, closed interrupter contacts 120, lead 131 (which is connected to the "D" panel terminal, Group M), transmission line 132, closed contacts of the interrupter switch 122 (of distant stepping switch 30), cable 133, closed contacts of the interrupter switch 123, cable 134, closed contacts of the interrupter switch 124, cable 135 (which is connected to the "C" panel terminal, Group M), lead 136 and lead 139 that is connected to the lower terminal of the coil 127.

It will now by clear that when the transfer relay 95 is de-energized, power is supplied to the coil 127 of the auxiliary interrupter relay 121, and that the interrupter relay controls the energization of the operating coils of all the stepping switches. When all of the stepping switches have advanced one position, the short circuting circuit, just described, de-energizes the interrupter relay although the transfer relay remains in the de-energized position. Once the coil 127, of the interrupter relay is de-energized, that is, short-circuited, the spring-biased ratchet arrangements of the stepping switches open the associated interrupter contacts whereby the coil 127 is again energized, that is, the short-circuit is removed. Consequently, the interrupter relay 121 continues to pulse in synchronism with all the stepping switches so long as the transfer relay is de-energized.

I have already explained that the transfer relay is energized during periods when the system is dormant and that under such condition no voltage is applied to the operating coil of the auxiliary interrupter relay and, also, that depression of any one of the push-button switches 81 to 90 de-energizes the transfer relay thereby applying power to the coil of the interrupter relay. Consequently, the interrupter relay will pulse so long as any of the push-button switches are depressed and it remains now to describe how the depression of a particular push-button switch will cause the interrupter relay to advance all of the stepping switches a predetermined number of positions to thereby select only one specific element of the three, 10 element bulbs associated with the three storage tanks of a selected tank group.

With the tank selector switch 46 set to the number 2 position, as shown, we shall assume that push-button switch 81 is depressed, such switch being identified as the correct one for measuring the average temperature of the selected tank when the level of the oil therein is between 3 and 5 feet (see also Figure 4). Depression of the pushbutton 81 opens the lower contacts 91, 92 (which de-energizes the transfer relay 95) and closes the upper contacts 93, 94. Contact 94 is connected only to stationary contacts 1, 11 and 21, of the stepping switch banks 66, 69, 72, respectively, and the individual wiper arms 65, 68, 71 of such switch banks are connected respectively to the stationary contacts 1, 2 and 3 of the deck 53 of the rotary tank selector switch 46. Since the wiper arm 50, of the deck 53 is connected to one side of the operating coil 107 of the transfer relay the circuit to such operating coil can only be closed through the stationary contact engaged by such wiper arm, disregarding for the moment the off-normal switch 104 associated with the stepping switch bank 66. Consequently, the interrupter relay 121 will pulse to cause a step-by-step advancement of all the stepping relays until the transfer relay coil 107 is again energized to open the circuit to the interrupter relay. This will happen only when the wiper arm 68, of the stepping switch bank 69 is in the illustrated, solid line position since the wiper arm 50 of the rotary switch deck 53 is set to engage the stationary contact number 2. The circuit for energizing the transfer relay may be traced as follows starting from the plus (+) terminal of the rectifier 45; leads 96, 97, closed upper blades 93, 94 (of push-button switch 81), leads 110, 112, 113, contact number 11 (of stepping switch bank 69), wiper arm 68, lead 67, contact number 2 (of the rotary switch deck 53), wiper arm 50, lead 140, lead 106, operating coil 107, and lead 108 to the negative (—) terminal of the rectifier. Thus, it will now be clear that the interrupter relay and the stepping switch banks 66, 69, 72 are set into pulse, or step-by-step operation when a push-button switch is depressed and such operation will continue until the transfer relay is energized upon circuit closure by that stepping switch (of the stepping switch banks 66, 69, 72) connected to the selected contact of the bank selector deck 53.

I have already stated that the system always returns to a normal reference, or home position after each measurement, and that the relative home positions of the stepping switch wiper arms are, in each case, shown by the broken lines. Assume now that the system is dormant and all of the decks 51, 52, 53 of the tank selector switch are set to the number 1 position. Depression of push-button 81 will result in only a single step of the level selector stepping switches since the closure of the upper contacts 93, 94, of the push-button switch 81, supply power to the number 1 contact of the stepping switch 66. Since each of the upper contacts 94, of the push-button switches 81–90, are individually connected to adjacent contacts on the stepping switch bank 66, the bank stepping switches will operate from 1 to 10 times depending upon which of the push-buttons 80–91 is depressed. Thus, by way of further illustration, depression of the push-button switch 90 will result in ten operations of the stepping switch banks 66, 68, 72 as power is then supplied only through contact number 10 of the stepping switch bank 66. If, now, all of the decks of the bank selector switch are set to the number 2 positions, as shown, it will be clear that all of the contacts of the stepping switch banks 66 and 72 are inactive since only the wiper arm 68 of the stepping switch bank 69 is connected to the operating coil of the transfer relay 95. Depression of push-button 81 now results in 12 operations of the stepping switch banks 66, 68, 72 since power is supplied through contact number 11 of stepping switch 69 through the upper closed contacts of the push-button switch 81. Depression of push-button switch 90 results in 21 such operations since such push-button supplies power to contact number 20. If, now, the bank selector deck 53 is set to the number 3 position, depression of the push-button switches 81 to 90 will correspondingly result in 22 to 32 operations of the stepping switch banks 66, 68, 72, since only the wiper arm 71 of the stepping switch 72 is connected to the operating coil of the transfer relay. The number of step-by-step operations of the stepping switch banks 66, 68, 72 correspond precisely to the number of pulse operations of the auxiliary interrupter relay 121, as this relay controls the actual operation of the stepping switches, and the pulse operations of this relay are transmitted as electrical impulses over the transmission wires to the distant stepping switches 30, 31, 32 through means including the contacts 145, 146 and 147 of the interrupter relay. This pulse generating and transmission arrangement will now be described.

The contacts 145, 146, 147, of the interrupter relay are normally open, as shown in the drawing. When the operating coil 127 is energized the movable contact 145 engages both of stationary contacts 146 and 147 thereby completing the switching circuit which may be traced as follows from the positive (+) terminal of the rectifier 45; lead 150, lead 151, closed contacts 145, 146, lead 151, lead 153, wiper arm 48 (of the tank selector switch deck 51), lead 60 (connected to the "B" panel terminal), wire 155 (connected to each of the "B" terminals on the distant stepping switches 30, 31, 32), the power supply leads 160, 160', 160'' (individually connected to the common leads of the resistance bulbs in the associated tanks), the leads 161, 161', 161'' (individually connected to each of the stepping switch operating coils 33, 34, 35), the individual leads 162, 162', 162'' (each connected between the other side of the associated operating coils and the respective "C" terminals on the stepping switches), the transmission wire C (connected between all of the "C" terminals on the stepping switches and the "C" terminal on the central panel) lead 136, and lead 108 back to the negative (—) terminal of the rectifier. It will be noted that energization of the auxiliary interrupter relay results in a simultaneous closure of the movable relay contact 145 with both of the stationary contacts 146 and 147. While the closure of contacts 145 and 146 energizes the distant stepping switches, as just described, closure of the contacts 145 and 147 energizes the operating coil 80 of the stepping switch banks 66, 69, 72. The latter circuit may be traced as follows from the positive (+) terminal of the rectifier; lead 150, lead 151, closed relay contacts 145, 147, lead 152', operating coil 80, lead 152'', lead 108 to the negative (—) terminal of the rectifier.

At this point it is believed the following summary will be helpful: depression of one of the push-button switches 81–90 de-energizes the transfer relay 95 which energizes the operating coil of the auxiliary interrupter relay 121. The interrupter relay energizes the operating coils of all the stepping switches and such stepping switches advance a predetermined number of steps depending upon which push-button has been depressed thereby selecting the proper element of the multi-element resistance bulb in the selected tank. When such switching operation is completed the transfer relay is automatically energized again whereby relay contacts 137, 134 are closed thereby conditioning the system for the measurement function, which function will now be described in detail.

In Figure 3 I show the indicating instrument 44 provided with two sets of terminals, namely, the left two terminals labeled 110 v. A. C., and the three terminals individually labeled A, B, C. The 110 v. A. C. terminals are connected directly to the 110 volt A.-C. line, as shown, whereas the terminals A, B, C are connected to a test switch 165 having leads 166 and 167 respectively connected to the wiper arms 49 and 48 (of the tank selector switch 46) and the lead 168 connected to the stationary contact 134 of the transfer relay 95.

Figure 5:
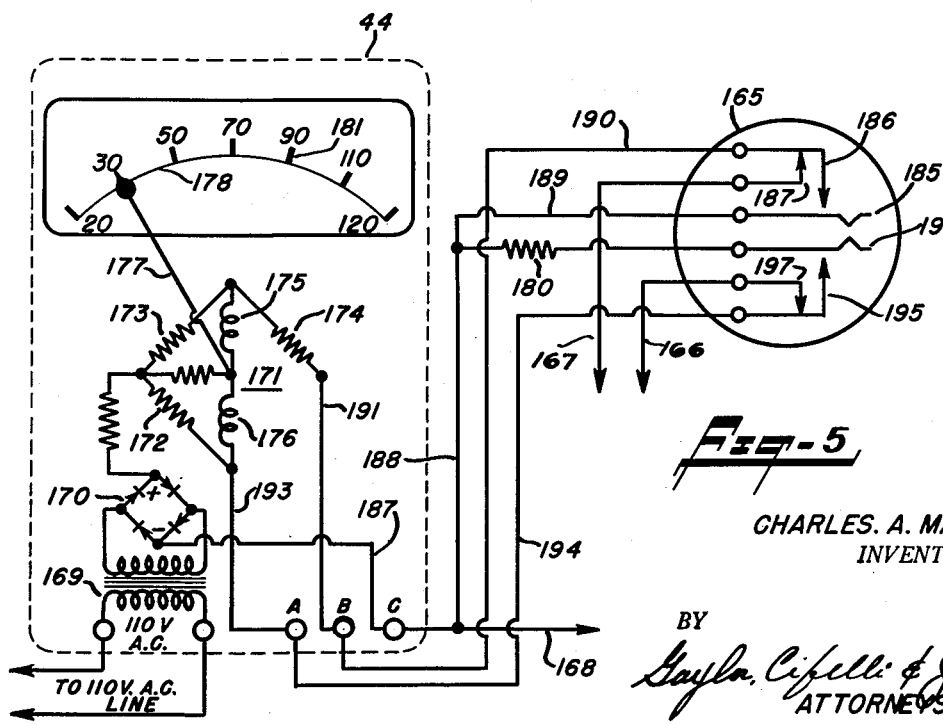
Figure 5 is a wiring diagram of the indicating instrument and associated test switch.

Reference is now made to Figure 5 which is a circuit diagram of the indicating instrument and the test switch. The instrument 44 is a self-contained ratio meter including a transformer 169, a rectifier 170 and a Wheatstone bridge 171. The bridge comprises the three fixed resistance arms 172, 173, 174 and a fourth arm comprising such element as may be connected to the terminals A and B. The output voltage of the rectifier 170 is applied across one set of bridge diagonals and the pivotallymounted, instrument movable coils 175, 176 are connected across the other set of bridge diagonals. Those skilled in this art will understand that the pointer 177 and the movable coils 175, 176 are secured together and that the pointer deflection relative to a calibrated scale 178 will depend upon the ratio of the currents flowing the movable coils. Such current flow in the instrument movable coils is determined by the extent of the bridge unbalance brought about by the ohmic value of any resistor forming the fourth arm of the bridge. Thus, when the fourth bridge arm is a pre-adjusted test resistor 180, the instrument will be alined with a predetermined mark on the scale as, for example, the mark 181, if the measuring circuit network is in proper operating order. The function of the test switch 165 is to insert the resistor 180 into the bridge circuit for this purpose. When the test switch is depressed, the contact blade 185 engages the blade 186 and the contact blade 186 leaves the blade 187. This connects the negative (—) terminal of the rectifier 170 to the right hand bridge diagonal the circuit comprising the leads 187, 188, 189, closed switch blades 185, 186, and leads 190, 191. The lower portion of the test switch operates in a similar manner to connect the test resistor 180 to the bridge, the circuit comprising the leads 193, 194, the closed contact blades 195, 196, resistor 180, lead 189, closed contact blades 185, 186 and the leads 190, 191. When the test switch 165 is in its normal position, as shown in the drawing, the negative (—) terminal of the rectifier is connected by the lead 168 to the common lead of the distant resistance bulbs and the particular selected element is connected across the leads 166, 167 whereby the instrument pointer deflection is determined by the temperature of such single, selected resistance element. This will become apparent from a further study of Figure 3, it being borne in mind that the fourth bridge arm terminals are brought directly to the leads 166, 167 when the test switch 165 is in the normal position illustrated in Figure 5.

In Figure 3, the power lead 168, from the instrument rectifier, is connected to the terminal C on the central panel through the closed contacts 134, 137, of the transfer relay and the lead 136, said relay contacts being closed when the system is conditioned for the measurement functions, as has already been described. Such panel terminal C is connected by the transmission cable to each of the C terminals on the distant stepping switches 30, 31, 32, and, therefore, power from the instrument rectifier is brought directly the common junctions of the resistance bulb element through the operating coils of the stepping switches 30, 31, 32 and the leads 161, 161', 161", respectively. Since these operating coils are of relatively low resistance their inclusion in this circuit has no adverse effect and for all practical purposes the described circuit is of the conventional type wherein the resistance of the leads between the resistance elements and the source of power is cancelled out of the measurement circuit. The one bridge terminal leads 166, 167 are connected across a selected resistance element by the setting of the tank selector switch 46. Assuming the tank selector switch is set as illustrated, this circuit may be traced as follows: lead 167, wiper arm 48, contact number 2, lead 60, transmission cable 155 (connected to each of the B terminals on the distant stepping switches 30, 31, 32), lead 160' (of tank 2) resistance element 200 (of tank 2), lead 201, the wiper arm of stepping switch 31, lead 202, transmission cable 203, lead 62, wiper arm 49 (of the tank selector switch bank 52), to lead 166. I have already described how the system operates by pulses to set the distant stepping switches so as to select only one (1) of the thirty (30) resistance elements in the three bulbs associated with the three tanks of Group M, and how the number of pulses depends upon the particular push-button switch depressed by the operator.

When the operator depresses one of the push-button switches 81–90, the stepping switches will all advance in unison to select the particular resistance element after which the system is automatically transferred over to the measurement function, by the transfer relay, whereby the instrument 44 will indicate the temperature of the oil at the selected tank and level. When the operator has noted such temperature reading he releases the button which opens the circuit of the transfer relay thereby throwing the system into pulse operations and all stepping switches will continue to advance, step-by-step, until the wiper arm 65 of the stepping switch bank 66 returns to the normal reference, or home, position as shown by the dotted line. It is only when this wiper arm is in the home position that the movable blade of the switch 104 engages the upper blade to complete the series circuit to the transfer relay. During all other positions of the wiper arm 65 these contact blades of the switch 104 are open and power for the operating coil of the transfer relay can only be supplied through a series circuit that includes the upper contact blades 93, 94 (of the push-button switches) and the proper stationary contact of the thirty contacts on the stepping switch banks 66, 69, 72. When the system is in the home, or dormant, position the wiper arms of the distant stepping switches 30, 31, 32 will be in the dotted line positions from which it is apparent that only the resistor R is connected into the circuit. The ohmic resistance of the reference resistor R is different from that of the test resistor 180 so that the instrument pointer will be alined with two, widely separated, predetermined reference marks on the scale, depending upon which resistor is connected into the measuring circuit. Specifically, when the test resistor 180 is connected into the circuit, upon depression of the push-button switch 165, the instrument pointer will be alined with a reference mark disposed somewhat above mid-scale, and when the reference resistor R is in the measuring circuit the instrument pointer will be alined with the lowest line on the scale. Since the system always returns to the home position after each temperature reading the instrument pointer should remain alined with the lowest scale mark when the system is dormant thereby providing an automatic check of the condition of the network between the instrument positioned in the control house and the distant tank 1. In order to test the network to tank 2 or tank 3 of, say, Group M, the operator sets the tank selector switch to the corresponding number and merely depresses the push-button switches 99, or 100, respectively. The upper contact blade 94 of the push-button switch 99 is connected only to the O–2 contact on the stepping switch bank 69. From what has been explained above it will be seen that when the push-button switch 99 is depressed the system will pulse until the wiper arm 68 engages the reference position contact O–2 to again energize the transfer relay. When the wiper arm 68 is in this position the wiper arm of the distant stepping switch 31 will also engage its contact O–2 thereby connecting the test resistor R' into the measuring circuit. Push-button switch 100 operates in a similar manner to connect the test resistor R" into the measuring circuit.

All of the reference resistors R, R', R" are of the same ohmic resistance values so that inclusion of any one into the measuring circuit will provide the same pointer indication, namely, at the lowest mark on the scale. Consequently, if the operator chooses to test the instrument calibration, per se, he merely depresses the test switch 165. Release of such push-button switch automatically checks the system to tank 1, and the depression of test switches 99 and 100 checks the system to the other two tanks of the group. The same test switches will test the system to all other tanks by merely setting the tank selector switch 46 to the desired tank number. For example, if it is desired to check the circuit to tank No. 9, that is, the third tank of Group O, the operator merely sets the tank selector switch to the number 9 position whereby the associated switch decks 51 and 52 will condition the system so that depression of the test switch 100 will test the circuit to such tank. The system to the first tank of the Group O unit, namely number 7, would be checked automatically every time the system is returned to the normal reference, or home, position, as has been described with specific reference to tank 1 of Group M.

In order to warn the operator against turning of the tank selector switch 46 during such time as the system is in pulse operation, with the attendant possibility of throwing the pulse selector switches 66, 69 and 72 out of synchronism with the distant selector switches, I provide a signal lamp 210. This lamp is connected to the output of the rectifier 45 through a dropping resistor 211 and the circuit arrangement is such that the lamp is energized when the system is dormant and is "out" when the system is pulsing. As shown in Figure 4, the lamp is positioned immediately above the tank selector switch dial 75 and preferably is covered by a red, bull's-eye lens 212. When all of the push-button switches are in the normal, non-depressed, position the circuit for energizing the signal lamp may be traced as follows: from the positive (+) terminal of the rectifier 45; leads 96, 97, the closed lower contacts blades of all the push-button switches 81—90, 99 and 100, lead 101, 213, the lamp filament, resistor 211 and lead 214 back to the negative (—) terminal of the rectifier. As described hereinabove, when the system is set into pulse operation the movable blade of the interrupter switch 104 (associated with the stepping switch 66) closes with the lower stationary blade and remains so until the system returns to the home position. It will be noted that closure of these contacts short-circuits the signal lamp by means of the connecting leads 103 and 215 whereupon the lamp remains de-energized until the system returns to the home position.

Before proceeding to describe an actual operating cycle of the system I wish to call attention to the contacts 220 on the transfer relay 95. These contacts which are closed when the relay is de-energized (that is, when the system is in pulse operation) are connected directly to the leads 166 and 167 that are connected to the terminals forming the fourth arm of the bridge housed within the indicating instrument, see also Figure 5. The contacts 220 actually short-circuit the A and B terminals of the instrument bridge. Since power has already been removed from the bridge through the opening of contacts 134, 137, of the transfer relay, this short circuit acts to eliminate inductive impulses likely to be transferred from the switching circuit to the metering circuit. The circuit constants are so chosen that when the stated transfer relay contacs 220 are closed the instrument pointer will fall below the zero scale mark and will remain there will until the pulsing operations are completed and the transfer relay automatically converts the system to the measurement function.

A complete cycle of operation will now be described with reference to Figure 3. It should be borne in mind that from an operational point of view the system must perform two functions, namely, (1) switching for selection of the proper thermometer element to be measured and (2) the metering of this temperature measurement at the remote panel. It will be assumed that it is desired to take the average temperature of tank number 2, of Group M and that the level of the oil contained in such tank is 4 feet. After closing the power line switch 42 the operator manually sets the tank selector, three deck switch 46 to the number 2 position, as shown in the drawing. The wiper arms 48 and 49, of the switch decks 51, 52, respectively, immediately removes from consideration all other tank groups, and the engagement of the wiper arm 50, of the bank selector deck 53 activates only the wiper arm 68 of the stepping relay 69. The signal light 210 is, of course, lighted, since the system is dormant, and the transfer relay is energized. The 4 foot oil level obviously is controlled by the push-button switch 81 (see also Figure 4). The operator depresses the push-button switch 81 whereupon the transfer relay is de-energized transferring power to the operating coil of the auxiliary interrupter relay. The interrupter relay works mechanically with all of the stepping switches, including the distant stepping switches 30, 31, 32 of the selected tank M group, whereby all such switches advance step-by-step until the wiper arm 68 of the switch 69 reaches the live contact number 11 whereupon the transfer relay is energized removing power from the interrupter relay and transferring power to the metering circuit. At the first pulse of the system the signal light 210 goes out. The number of steps advanced by the distant stepping switches 30, 31, 32 is equal to those advanced by the stepping switches at the central panel and, consequently, only the resistance element 200 is connected in the measuring circuit. The instrument 44, therefore, indicates the temperature of this element. It may here be pointed out that the step-by-step operation of the stepping switches 66, 69, 72 produces audible clicks so that the operator knows when the system has ceased pulsing and been transferred over to the measurement function. After noting the meter reading the operator permits the push-button switch 81 to return to its normal position whereby the transfer relay is again de-energized to supply power to the interrupter relay. The system continues its pulse operation until the wiper arm 65, of the stepping switch 66 returns to the home position thereby energizing the transfer relay and the signal light. The system is now ready for another operating cycle.

It is again pointed out that the wiring of the system makes it unnecessary for the operator to know the particular groupings of the storage tanks as this matter is taken care of when the sytem is installed. All the operator must know is the number assigned to the various tanks and the level of the oil in the tanks at the time he desires to take a reading. The latter information is obtained periodically by other means.

While the described system is capable of accommodating 24 tanks in groups of three it will be apparent the system may be expanded merely by substituting a tank selector switch having a greater number of contact positions. Similarly, the number of tanks in a group may be varied by choice of stepping switches with contacts arranged in 90°, 180°, or etc., arcs. Further, those skilled in this art will understand that a recorder may be used in place of, or in addition to, the indicating instrument 44.

Having now described my invention in detail in accordance with the patent statutes, various changes and modifications will suggest themselves to those skilled in this art and it is intended that such changes and modifications shall fall within the spirit and scope of the invention as recited in the following claims.

I claim:

1. An electrical system for obtaining at a remote station the average temperature of a liquid stored in a tank, said system comprising a plurality of resistance elements extending upwardly from the bottom of the tank and terminating at different levels, said elements having equal ohmic resistance at a given temperature; a stepping switch at the tank and having a plurality of stationary contacts individually connected to the upper ends of the resistance elements; a measuring circuit at the station, said circuit including three arms of a four arm bridge having junctions 1, 2, 3 and 4 and a temperature-indicating instrument connected across opposed bridge junctions 1 and 3; a source of electrical power at the station one side of the source being connected to bridge junction 4; a first transmission line connected at one end to bridge junction 2 and on the other end to the lower end of each resistance element and one terminal of the stepping switch operating coil; a second transmission line connected between the adjacent bridge junction 3 and the wiper arm of the stepping switch; a third transmission line connected between the other terminal of the stepping switch operating coil and the other side of the source of electrical power; manually-actuated means to connect the first transmission line to the said one side of the source of power; means effective upon actuation of the manually-actuated means to impress a predetermined number of electrical impulses over the first and third transmission lines to thereby advance the stepping switch wiper arm to a selected position; and automatic means effective when the said wiper arm reaches the predetermined position to disconnect the first transmission line from the source of power.

2. The invention as recited in claim 1 including means short-circuiting the bridge junctions 2 and 3 during operation of the stepping switch.

3. The invention as recited in claim 1 including means effective upon release of the manually-actuated means to return the said wiper arm to its starting position.

4. The invention as recited in claim 3 including a checking resistor of predetermined ohmic value and circuit elements to connect the said checking resistor into the measuring circuit when the wiper arm is in its starting position.

5. An electrical system for obtaining at a central station the average temperature of liquids stored in a plurality of remote tanks, said system comprising a multi-element resistance bulb in each tank, each bulb consisting of a plurality of resistance wires extending upwardly from the bottom of the tank and terminating at different levels and all such resistance wires having equal nominal resistance; a first set of transmission lines terminating at the station; a stepping switch at each tank each stepping switch having an operating coil and arranged to connect any one of the associated resistance wires to the first set of transmission lines; a second set of transmission lines; a source of electrical power at the station; a manually-operable selector switch at the station and effective to connect the operating coil of a selected stepping switch to the source of power through the second set of transmission lines; a transfer relay having a set of normally-closed contacts connected in series between the source of power and the selector switch; a set of normally-closed contacts and an operating coil, a 3-deck stepping relay at the station said relay having an operating coil energized from the source of power through the normally-closed contacts of the transfer relay; a plurality of push-button switches at the station each switch corresponding to the resistance wires of each resistance bulb; a set of normally-closed contact blades on each push-button switch all such contact blades being connected in series between the power source and the operating coil of the transfer relay whereby the transfer relay is energized when all of the push-button switches are in the normal position; a set of normally-open contact blades on each push-button switch one blade of each set being connected to the source of power and the other blades being connected to like-positioned stationary contacts on each deck of the said stepping relay; leads connecting the wiper arms of said stepping relay to the operating coil of the transfer relay through the said selector switch; the arrangement thus far recited being such that depression of one of the push-button switches de-energizes the transfer relay and the closure of the normally-closed relay contacts results in a step-by-step advance of the stepping switches and stepping relay until the wiper arm of the latter engages the stationary contact that is connected to the depressed push-button switch whereupon the transfer relay is again energized; and a measuring circuit including a temperature-indicating instrument at the station and connected to the first set of transmission lines through the set of normally-open contacts on the transfer relay.

6. The invention as recited in claim 5 including circuit elements connecting the normally-closed contact blades of the push-button switches to the source of power through a reference position contact on the 3-deck stepping relay and the associated wiper arm, the recited arrangement being such that upon release of the depressed push-button switch the transfer relay is de-energized until the said associated wiper arm comes into engagement with the said reference position contact.

7. The invention as recited in claim 6 including a standard resistor that is connected into the measuring circuit when the stepping relay is in the reference position.

8. The invention as recited in claim 6 including means rendering the measuring circuit ineffective during operation of the stepping switches.

9. The invention as recited in claim 6 including a checking resistor; a manually-operable checking switch having a pair of normally-closed contacts completing the measuring circuit; and circuit elements including a pair of normally-open contacts on the said checking switch adapted to connect the checking resistor into the measuring circuit upon operation of the checking switch.

References Cited in the file of this patent

UNITED STATES PATENTS

| | | |
|---|---|---|
| 1,496,101 | Schmitt | June 3, 1924 |
| 1,867,870 | Baker et al. | July 19, 1932 |
| 2,549,401 | Stein et al. | Apr. 17, 1951 |
| 2,606,808 | Brown | Aug. 12, 1952 |
| 2,625,043 | Tapp et al. | Jan. 13, 1953 |

FOREIGN PATENTS

| | | |
|---|---|---|
| 322,333 | Germany | June 26, 1920 |